Figure 1:
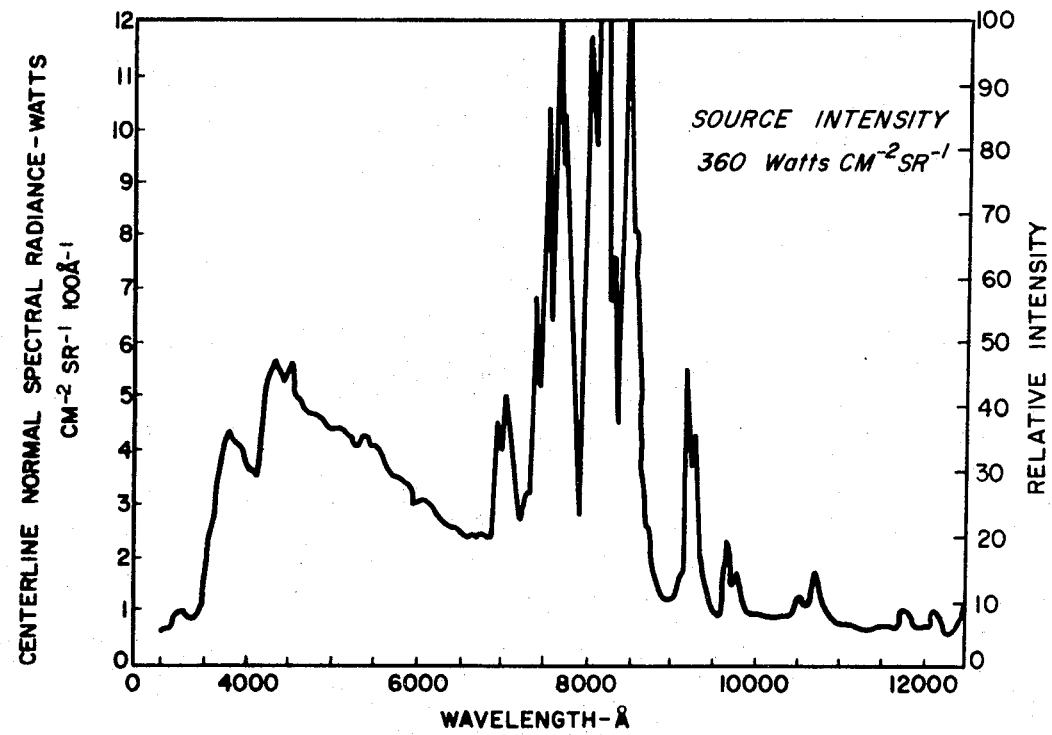

United States Patent [19]

Sandner et al.

[11] 3,715,293
[45] Feb. 6, 1973

[54] ACETOPHENONE-TYPE PHOTOSENSITIZERS FOR RADIATION CURABLE COATINGS

[75] Inventors: Michael Ray Sandner; Claiborn Lee Osborn, both of Charleston, W. Va.

[73] Assignee: Union Carbide Corporation, New York, N.Y.

[22] Filed: Dec. 17, 1971

[21] Appl. No.: 209,066

[52] U.S. Cl. ........204/159.14, 117/93.31, 117/132 R, 96/115 P, 204/159.15, 204/159.19, 204/159.23
[51] Int. Cl. .............................. C08d 1/00, C08f 1/16
[58] Field of Search....... 204/159.23, 159.24, 159.14, 204/159.15; 96/115 P

[56] References Cited

UNITED STATES PATENTS 3,657,088    4/1972    Heine et al. ...................... 204/159.23
3,582,487    6/1971    Fuhr et al. ........................ 204/159.23

Primary Examiner—Murray Tillman
Assistant Examiner—Richard B. Turer
Attorney—Paul A. Rose et al.

[57] ABSTRACT

Acetophenone compounds have been found useful as photosensitizers in radiation curable coating compositions. The novel photosensitizers of this invention contain the structural group

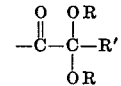

in which R is an alkyl or aryl group and R' is hydrogen, alkyl, aryl, or cycloalkyl.

4 Claims, 4 Drawing Figures

ACETOPHENONE-TYPE PHOTOSENSITIZERS FOR RADIATION CURABLE COATINGS

BACKGROUND OF THE INVENTION

Many photosensitizers are known for the radiation curing of coating compositions or the polymerization of vinyl monomers. These fall into many classes and include compounds such as acetophenone, propiophenone, benzophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 3-methoxyxanthone, 3-iodo-7-methoxyxanthone, and the like.

Also known are certain benzoin derivatives as are disclosed in German Patent No. F 52340 IVc/396. Many of these, while satisfactory, could be improved upon. This invention discloses a novel class of acetophenone compounds that show desirable properties for the radiation curing of coating compositions by non-ionizing radiation means.

DESCRIPTION OF THE INVENTION

In the process of this invention any of the non-ionizing radiation curable coating compositions can be cured. These compositions are well known to those skilled in the art and their preparation and application, as well as their components thereof, need not be described in detail here. This invention is not to specific coating compositions but it is a novel class of acetophenone photosensitizers that can be used in any radiation curable coating composition that can be cured by non-ionizing radiation.

In the process of this invention acetophenone photosensitizers are added to the coating composition and the composition is then cured. The acetophenone photosensitizers useful in this invention are those of the structure:

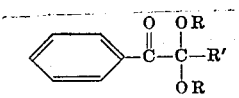

wherein R is alkyl of from one to about eight carbon atoms (methyl, ethyl, propyl, isopropyl, butyl, isobutyl, t-butyl, pentyl, neopentyl, hexyl, heptyl, octyl, 2-ethylhexyl) or aryl of six ring carbon atoms (phenyl, tolyl, xylyl, chlorophenyl, dichlorophenyl, methoxyphenyl, nitrophenyl, hydroxyphenyl, carboethoxypehnyl) and R' is hydrogen, alkyl of from one to about eight carbon atoms, aryl of from six to 14 carbon atoms (phenyl, naphthyl, anthracyl, tolyl, xylyl, methoxyphenyl, nitrophenyl) or cycloalkyl of five to eight ring carbon atoms (cyclopentyl, methylcyclopentyl, dimethylcyclopentyl, ethylcyclopentyl, cyclohexyl, methylcyclohexyl, cyclopentyl, bicycloheptyl, cyclooctyl, bicyclooctyl).

Illustrative thereof are 2,2-dimethoxyacetophenone, 2,2-dimethoxy-2-phenylacetophenone, 2,2-diethoxyacetophenone, 2,2-dibutoxyacetophenone, 2,2-dihexoxyacetophenone, 2,2-di(2-ethylhexoxy)acetophenone, 2,2-diphenoxyacetophenone, 2,2-ditolyloxyacetophenone, 2,2-di(chlorophenyl)acetophenone, 2,2-di(nitrophenyl)acetophenone, 2,2-diphenoxy-2-phenylacetophenone, 2,2-dimethoxy-2-methylacetophenone, 2,2-dipropoxy-2-hexylacetophenone, 2,2-diphenoxy-2-ethylacetophenone, 2,2-dimethoxy-2-cyclopentylacetophenone, 2,2-dipentoxy-2-cyclohexylacetophenone, 2,2-di(2-ethylhexyl)-2-cyclopentylacetophenone, 2,2-diphenoxy-2-cyclopentyl-acetophenone, 2,2-di(nitrophenoxy)-2-cyclohexylacetophenone.

Those compounds having the structural group

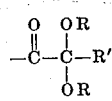

in the molecule have not heretofore been known to be useful as photosensitizers in radiation curable coating compositions.

These acetophenone photosensitizers are readily produced by procedures that are known. For example, the 2,2-dialkoxy (or diaryloxy)-2-phenyl acetophenones can be produced by the reaction of benzil with the corresponding alkyl iodide or aryl iodide in dimethylformamide with barium oxide. This reaction is carried out at ambient temperatures as described by R. Kuhn and H. Trischmann, Chemische Berichte, Volume 94, page 2,258. The 2,2-dialkoxy (or diaryloxy) acetophenones can be produced by the reaction of acetophenone with an alcohol in the presence of nitrosyl chloride as described in U.S. Pat. No. 2,995,573.

The concentration of acetophenone photosensitizer that can be present in the reaction mixture undergoing radiation treatment can vary from 0.01 weight to 20 weight per cent thereof; preferably from 0.1 weight per cent to 5 weight per cent and most preferably from 1 weight per cent to 3 weight per cent. If desired other known photosensitizers and/or activators can also be present.

While we have indicated that any radiation curable coating composition can be used it is understood that the coating composition is a mixture of the radiation curable coating system and the acetophenone photosensitizer defined above. The coating composition can contain a polymer dissolved or dispersed in a reactive monomer solution, a reactive polymer alone that can be cured by radiation, a reactive monomer alone that can be cured by radiation, or any of the above in admixture with an inert solvent. In addition to the acetophenone photosensitizers defined above one can also have present in the coating composition any of the known photosensitizers or activators previously used in this field. The coating composition can also contain any of the conventional fillers, pigments, cross-linkers, wetting agents, flatting agents and other additives typically present in coating compositions. Many of these additives are known in the art and a detailed elaboration herein is not necessary to inform one skilled in the art as to their identity. Also, those skilled in the art are fully familiar with the concentrations of these additives suitable. The coating compositions containing the acetophenone photosensitizers are cured by exposure to non-ionizing radiation.

As a suitable source of non-ionizing radiation, one can use any source which emits radiation of from about 2,000 Angstroms to about 8,000 Angstroms, preferably from about 2,500 Angstroms to about 4,500 Angstroms. Suitable sources are mercury arcs, carbon arcs, tungsten filament lamps, xenon arcs, krypton arcs, sunlamps, lasers, and the like. All of these devices and sources are well known in the art and those familiar with the technology are fully aware of the manner in which the radiation is generated and the precautions to be exercised in its use.

Particularly efficient sources of non-ionizing light radiation for this invention are the ultraviolet mercury lamps and the swirl-flow plasma arc radiation arcs as described in U.S. Pat. No. 3,364,387. The apparatus or equipment necessary for generating the non-ionizing light radiation is not the subject of this invention and any source or apparatus capable of generating ultraviolet and visible light radiation can be used. The plasma arc emits non-ionizing high intensity predominantly continuum light radiation containing ultraviolet, visible and infrared light radiation that can be used to polymerize monomers and to crosslink polymer compositions in the initial step of the process of this invention. By means of proper light filters, one can selectively screen out a portion of the light radiation emitted permitting only that wavelength portion desired to reach the material that is being treated. The mercury lamps are known to emit ultraviolet light as the major light emission.

The term "non-ionizing high intensity predominantly continuum light radiation" means continuum radiation with radiance or source intensity of at least 350 watts per square centimeter steradian when integrated throughout the entire spectral range of said continuum light radiation (about 1,000 kilowatts per square foot of source projected area) having only a minor part of the energy in peaks of bandwidths less than 100 Angstrom units, with a positive amount up to about 30 per cent of the light radiated having wavelengths shorter than 4,000 Angstrom units and at least about 70 per cent but less than all of the light energy radiated having wavelengths longer than 4,000 Angstrom units. This type of non-ionizing high intensity predominantly continuum light radiation is illustrated by the curves shown in FIGS. 1 to 3. These curves illustrate the non-ionizing high intensity predominantly continuum nature of the light radiation over the range of source intensity of from about 350 watts per square centimeter steradian to about 5,000 watts per square centimeter steradian. As is evident from the curves of FIGS. 1 to 3 the light radiated is predominantly continuum light with very little light emitted as line or peak radiation (band widths less than 100 Angstroms units). It is also evident from FIGS. 1 to 3 that less than about 30 per cent of the light radiated has wavelengths shorter than 4,000 Angstroms and that at least about 70 per cent of the radiated light has wavelengths longer than 4,000 Angstrom units.

This form of light radiation is derived from an artificial source that generates non-ionizing high intensity predominantly continuum light radiation with a source intensity of at least about 350 watts per square centimeter steradian when integrated throughout the entire spectral range of said continuum light radiation, as abbreviated by the term: watts $cm^{-2}$ $sr^{-1}$; said non-ionizing high intensity predominantly continuum artificial light radiation has at least about 70 per cent of the light radiated at a wavelength longer than 4,000 Angstroms and a positive amount less than about 30 per cent of the light radiated having a wavelength shorter than 4,000 Angstroms, generally at least about 80 per cent of the light radiated has a wavelength longer than 4,000 Angstroms and a positive amount up to about 20 per cent of the light radiated has a wavelength shorter than 4,000 Angstroms, and it has a source intensity that can vary from about 350 watts (about 1,000 kilowatts per square foot of source projected area) to about 5,000 watts (about 15,000 kilowatts per square foot of source projected area) or more per square centimeter steradian when integrated throughout the entire spectral range. A convenient source of non-ionizing high intensity predominantly continuum light radiation is a swirl-flow plasma arc light radiation apparatus. The equipment for generating non-ionizing high intensity predominantly continuum light radiation by this means is known and available with many different forms thereof described in the literature.

While any artificial source of generating non-ionizing light radiation can be used, as previously indicated, the swirl-flow plasma arc radiation apparatus is most convenient. Hence, this source will be used in this application as illustrative of a means for obtaining the non-ionizing high intensity predominantly continuum light radiation. Any apparatus that operates according to the known principles of the swirl-flow plasma arc radiation source can be used to produce the non-ionizing high intensity predominantly continuum light radiation useful in the processes of this invention. These apparatuses are often known by other terms but those skilled in this art recognize that they emit non-ionizing high intensity predominantly continuum light radiation. The source of radiation in a 50 kilowatt swirl-flow plasma arc radiation source is an arc that is only about four inches long and this is enclosed in a quartz envelope or lamp about 1.5 inches in diameter. This lamp or quartz envelope can be readily removed and refurbished and has an acceptably long lifetime. Further, a swirl-flow plasma arc radiation apparatus having a 250-kilowatt rating would be only about two or three times as large as a 50-kilowatt source. Another advantage in the use of such equipment is the absence of a need for expensive radiation shielding. Precautions required for the artificial light sources include those needed to protect one's eyes from the intense light emitted and also to protect oneself from the ultraviolet light present to prevent inadvertent eye damage or sunburn effect on the body.

As is known, non-ionizing high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder, creates a swirling flow or vortex which restricts the arc to a small diameter. An electrical potential applied across the electrodes causes a high density current to flow through the gas to generate a plasma composed of electrons, positively charged ions and neutral atoms. A plasma generated in the above gases produces non-ionizing high intensity predominantly continuum light radiation with diffuse maxima in the region of from about 3,500 to about 6,000 Angstroms. The radiation source can also be used with reflectors or refractive optical systems to direct the non-ionizing high intensity predominantly continuum light radiation emanating from the arc to a particular point or direction or geometrical area.

Figure 3:
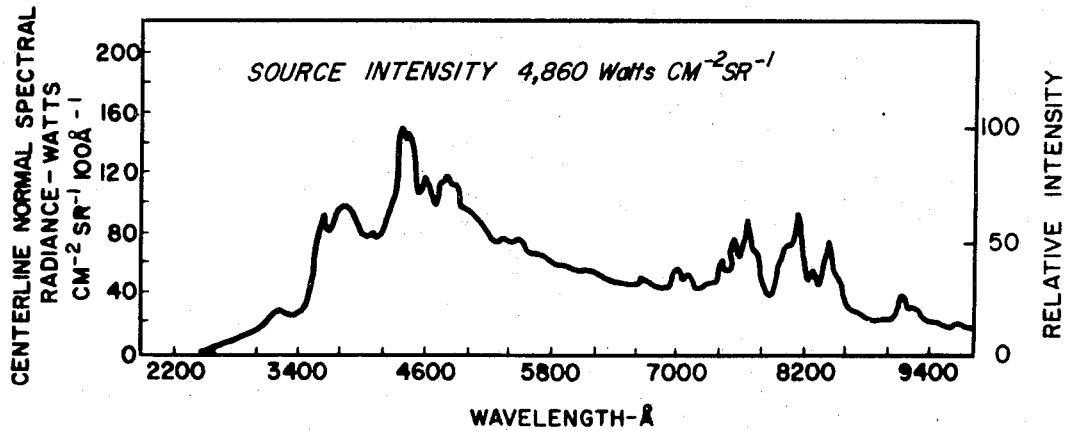
Figure 2:
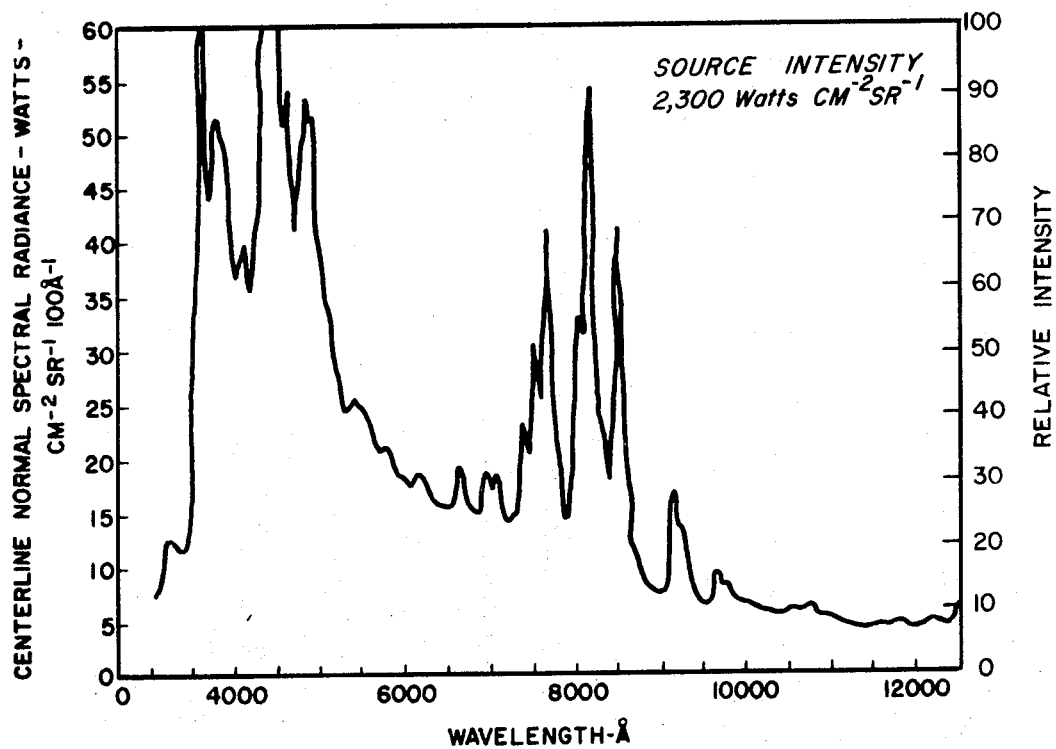

The non-ionizing high intensity predominantly continuum light radiation generated by a plasma arc is a continuum rather than a peak or line radiation. As can be seen from the spectra of FIGS. 1 to 3 there is a continuum of radiation throughout the entire spectral range shown. This type of continuum radiation in the ultraviolet range has not heretofore been obtainable from the conventional commercial mercury arcs or lamps generally available for generating ultraviolet light. The previously known means for generating ultraviolet light produced light that shows a line or peak spectrum in the ultraviolet range, as exemplified by FIG. 4; it is not a continuum spectrum in the ultraviolet range. In a line spectrum the major portion of usable ultraviolet light is that portion at which the line or band in the spectrum forms a peak; in order to obtain maximum use of such energy the material or composition that is to be treated with ultraviolet radiation must be capable of absorbing at that particular wavelength range at which the peak appears. In the event the material or composition does not have the ability to absorb at that particular wavelength range there is little or no absorption or reaction. Thus, in the event the material or composition to be treated absorbs at a particular wavelength range in one of the valleys of the spectral curve there will be little or no reaction since there is little or no ultraviolet energy to adequately excite the system. With a non-ionizing high intensity predominantly continuum radiation, as is shown by FIGS. 1 to 3, there is a high intensity predominantly continuum radiation of ultraviolet energy across the entire ultraviolet wavelength range of the spectrum shown and there is generally sufficient ultraviolet energy generated at all useful ultraviolet wavelengths to enable one to carry out reactions responsive to ultraviolet radiation without the problem of selecting compounds that will absorb at peak wavelength bands only. With the non-ionizing high intensity predominantly continuum radiation one does not have the problem of being unable to react materials or compositions that absorb in the valley areas only since for all intents and purposes such valleys do not exist in non-ionizing high intensity predominantly continuum radiation, the high intensity radiated light energy is essentially a continuum it is not in peak bands.

FIG. 1 is the light radiation curve from an 18 kilowatt argon swirl-flow plasma arc radiation source. The measured source intensity of the light was 360 watts per square centimeter steradian; about 8 per cent of the light had a wavelength shorter than 4,000 Angstrom units and about 92 per cent of the light had a wavelength longer than 4,000 Angstrom units.

FIG. 2 is the light radiation from a 60 kilowatt argon swirl-flow plasma arc radiation source. The measured source intensity was about 2,300 watts per square centimeter steradian; about 10 per cent of the light had a wavelength shorter than 4,000 Angstrom units and about 90 per cent of the light had a wavelength longer than 4,000 Angstrom units.

FIG. 3 is the light radiation from a 71 kilowatt argon swirl-flow plasma arc radiation source. The measured source intensity was about 4,860 watts per square centimeter steradian; about 12 per cent of the light had a wavelength shorter than 4,000 Angstrom units and about 88 per cent of the light had a wavelength longer than 4,000 Angstrom units.

Figure 4:
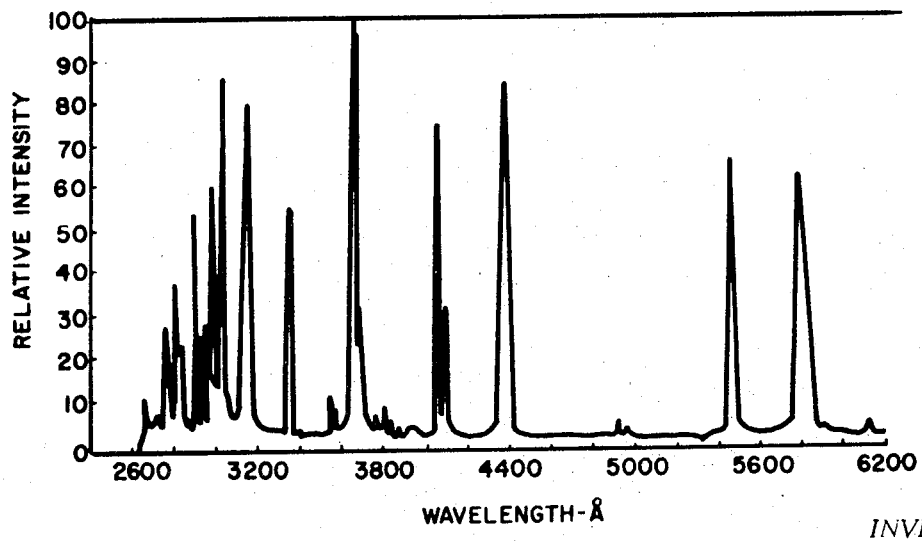

Non-ionizing high intensity predominantly continuum light radiation as shown by FIGS. 1 to 3 is to be distinguished from the low intensity ultraviolet radiation generated by commercially available low, medium and high pressure mercury arc ultraviolet lamps. These mercury arc lamps produce light emission which is primarily line or peak rather than continuum light. FIG. 4 is a typical curve for the light radiation from a mercury arc lamp. As shown in FIG. 4, a major part of the light appears in bands or peaks narrower than 100 Angstrom units, and much less than 70 per cent is emitted at wavelengths above 4,000 Angstrom units. Such line or peak ultraviolet light radiation is also suitable in the processes of this invention.

The irradiation can be carried out in air or under an inert gas atmosphere such as nitrogen, carbon dioxide, helium, neon, argon, etc. It is preferably conducted under an inert gas since air or oxygen tends to inhibit the curing reaction. It has also been found that the photosensitizers can be used to cure compositions such as films, elastomers, molding materials, laminates, and the like containing or produced with radiation curable compositions. The following example further serve to describe the invention:

EXAMPLE 1

A coating composition was prepared using 50 grams of a commercial polyester having internal unsaturation (Co Resyn I), 30 grams of 2-hydroxyethyl acrylate and 20 grams of neopentylglycol diacrylate. Two weight per cent concentrations of different photosensitizers were added to separate aliquots of the composition and then applied to No. 37 Bonderite steel panels at a wet film thickness of two mils. The coating panels were than exposed for 8 seconds in an air atmosphere to the ultraviolet light radiation from two 2.2 kilowatt mercury vapor lamps at a distance of about 10 inches. The two compositions containing the photosensitizers of this invention cured to dry films, whereas the compositions containing benzoin or a mixture of the n-butyl and isobutyl ethers of benzoin produced a tacky film. These results are tabulated below:

| Photosensitizer | Sward hardness glass = 100 | Acetone resistance, sec. |
|---|---|---|
| 2,2-dimethoxy-2-phenylacetophenone | 46 | 135 |
| 2,2-dimethoxyacetophenone | 26 | 1,099 |
| benzoin | tacky | |
| mixture of n-butyl and isobutyl ethers of benzoin | tacky | |

It was observed that the tacky films obtained did cure to dry films after a 12 second exposure. This required a 50 percent longer reaction period. 2,2-Diethoxyacetophenone also required 12 seconds to produce a dry film but this film had general overall properties better than the other films obtained with the benzoin photosensitizers after a 12 second exposure.

When the same coating compositions were irradiated under a nitrogen atmosphere dry coatings were produced in all instances within 1.2 seconds. The results are shown below:

| Photosensitizer | Sward hardness | |
|---|---|---|
| | 1.2 seconds | 2 seconds |
| 2,2-dimethoxy-2-phenylacetophenone | 42 | 34 |
| 2,2-diethoxyacetophenone | 26 | 28 |
| 2,2-dimethoxyacetophenone | 16 | 32 |
| benzoin | 14 | 18 |
| mixture of n-butyl and isobutyl ethers of benzoin | 24 | 26 |

These results show the general improvements of the acetophenones as compared to the benzoins in hardness properties of the films.

EXAMPLE 2

A coating composition was prepared by dissolving 70 grams of the same polyester used in Example 1 in 30 grams of styrene and then 2 weight per cent of various photosensitizers was added to aliquots thereof and coated on No. 37 Bonderite steel panels. The coated panels were irradiated in air as described in Example 1. The results clearly establish the superiority of 2,2-dimethoxy-2-phenylacetophenone over the conventional benzoin photosensitizers. As shown, the benzoin photosensitizers produced tacky films as compared to dry fully cured films when using 2,2-dimethoxy-2-phenylacetophenone.

| Photosensitizer | 4 second exposure | | 8 second exposure | |
|---|---|---|---|---|
| | A* | B* | A* | B* |
| 2,2-dimethoxy-2-phenylacetophenone | 22 | 224 | 44 | 519 |
| benzoin | tacky | | 26 | 232 |
| mixture of n-butyl and isobutyl ethers of benzoin | tacky | | 18 | 442 |

A*-Sward hardness
B*-Acetone resistance, sec

EXAMPLE 3

A 100 per cent solids coating composition was prepared by dissolving 50 grams of acrylated epoxidized soyabean oil in 30 grams of 2-hydroxyethyl acrylate and 20 grams of neopentylglycol acrylate. Different photosensitizers were added to aliquots of this composition at a concentration of 0.1 molal and each was applied to No. 37 Bonderite steel panels at a wet film thickness of two mils. The coated panels were then exposed for 1.2 seconds to ultraviolet light as described in Example 1. The data show the overall improvement obtained by the use of the photosensitizers of this invention; the particularly outstanding results of 2,2-dimethoxy-2-phenylacetophenone are clearly apparent.

| Photosensitizer | Sward hardness | Acetone resistance, sec. |
|---|---|---|
| 2,2-dimethoxy-2-phenylacetophenone | 18 | 70 |
| 2,2-dimethoxyacetophenone | 16 | 55 |
| benzoin | 12 | 50 |
| benzoin acetate | 0 | not cured |

EXAMPLE 4

The same coating composition described in Example 3 was cured by exposure to the non-ionizing high intensity predominantly continuum light radiation emanating from an argon 75-kilowatt plasma arc radiation source. Exposure was at a distance of about 4 feet from the arc. The composition containing the 2,2-dimethoxy-2-phenylacetophenone photosensitizer showed curing within 0.12 second, whereas none of the controls did; after 0.25 second it was still better than any of the benzoin controls.

| | Exposure Time | | | | | |
|---|---|---|---|---|---|---|
| | 0.12 | | 0.17 | | 0.25 | |
| Photosensitizer | A* | B* | A* | B* | A* | B* |
| 2,2-dimethoxy-2-phenylacetophenone | 4 | 25 | 10 | 25 | 16 | 45 |
| benzoin | 0 | 0 | 4 | 15 | 14 | 30 |
| benzoin acetate | 0 | 0 | 0 | 0 | 0 | 0 |
| benzoin n-butyl ether | 0 | 0 | 4 | 10 | 8 | 20 |
| benzoin isobutyl ether | 0 | 0 | 6 | 10 | 6 | 25 |

A*—Sward hardness
B*—Acetone resistance, sec

EXAMPLE 5

This example shows the use of the photosensitizers in the polymerization of acrylyl monomers. In this use, the 2,2-dimethoxy-2-phenylacetophenone class of compounds is superior to the 2,2-dialkoxyacetophenones even though these latter are also good. A solution of 5 grams of methyl methacrylate in 5 ml of benzene and containing 0.01 gram of the photosensitizer was placed in a test tube and sealed. The irradiation was carried out with the sealed tubes placed on a rotating carriage located about three inches interior of a circle of 16 Rayonet RPR-3,500 mercury lamps, each lamp rated at about 1.6 watts. The circle of mercury lamps had a diameter of about 12 inches. This equipment is available commercially as the Rayonet RPR-100 Reactor from the Southern New England Ultraviolet Co., Middletown, Conn. The irradiation was carried out at ambient temperatures for 90 minutes. The reaction mixture was then poured into 50 ml. of hexane and the poly(methyl methacrylate) was filtered, dried and weighed, it was a white powder. The yields are shown below:

| Photosensitizer | Yield | |
|---|---|---|
| | g | % |
| 2,2-dimethoxy-2-phenylacetophenone | 4.40 | 88.0 |
| 2,2-dimethoxyacetophenone | 3.25 | 65.0 |
| 2,2-diethoxyacetophenone | 3.08 | 60.1 |

What is claimed is:
1. In the method for curing curable monomeric and polymeric compositions by radiation with non-ionizing radiation, the improvement wherein the photosensitizer present in said compositions is a compound of the formula:

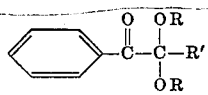

wherein R is alkyl of from one to eight carbon atoms or aryl of six ring carbon atoms and R' is hydrogen, alkyl of from one to eight carbon atoms, aryl of from six to 14 carbon atoms or cycloalkyl of five to eight ring carbon atoms; said photosensitizer being present in said composition at a concentration of from 0.01 to 20 weight per cent.

2. In the method as claimed in claim 1, the improvement wherein said photosensitizer is 2,2-dimethoxy-2-phenylacetophenone.

3. In the method as claimed in claim 1, the improvement wherein said photosensitizer is 2,2-dimethoxyacetophenone.

4. In the method as claimed in claim 1, the improvement wherein said photosensitizer is 2,2-diethoxyacetophenone.

* * * * *